United States Patent [19]
Kupfer

[11] Patent Number: 4,796,101
[45] Date of Patent: Jan. 3, 1989

[54] AUTOMATIC FM SIDEBAND LEVEL CONTROL FOR VIDEO RECORDERS

[75] Inventor: Karl-Heinz Kupfer, Krefeld, Fed. Rep. of Germany

[73] Assignee: U.S. Philips Corp., New York, N.Y.

[21] Appl. No.: 858,479

[22] Filed: May 1, 1986

[30] Foreign Application Priority Data

May 10, 1985 [DE] Fed. Rep. of Germany ....... 3516913

[51] Int. Cl.$^4$ .......................... H04N 5/78; G11B 5/04
[52] U.S. Cl. .................................. 358/335; 358/330; 360/25; 360/67; 360/68
[58] Field of Search ...................... 360/25, 66, 67, 68; 369/47, 48; 358/335, 330

[56] References Cited

U.S. PATENT DOCUMENTS

| | | | |
|---|---|---|---|
| 4,303,952 | 12/1981 | Yamamitsu et al. | 360/68 X |
| 4,370,681 | 1/1983 | Akagiri | 360/68 |
| 4,484,237 | 11/1984 | Muto | 360/25 |

FOREIGN PATENT DOCUMENTS 0119907  9/1981  Japan .................................. 360/25

Primary Examiner—Robert L. Richardson

[57] ABSTRACT

The invention relates to a circuit arrangement for a video playback apparatus, comprising a band-pass filter arranged after the video heads in the luminance-signal playback channel. The frequency characteristic of the band-pass filter is variable in order to influence the amplitude characteristic of the FM sideband spectrum. The band-pass filter is followed by an FM demodulator and a crispening circuit. The frequency characteristic of the band-pass filter is controlled automatically depending on the level of the high-frequency components in the demodulated luminance signal in that the frequency characteristic of the band-pass filter is varied by means of a pre-emphasised luminance signal taken from the crispening circuit in such a way that a luminance signal whose FM spectrum in substantially amplitude-symmetrical relative to the FM carrier frequency is produced on the output of the band-pass filter.

3 Claims, 1 Drawing Sheet

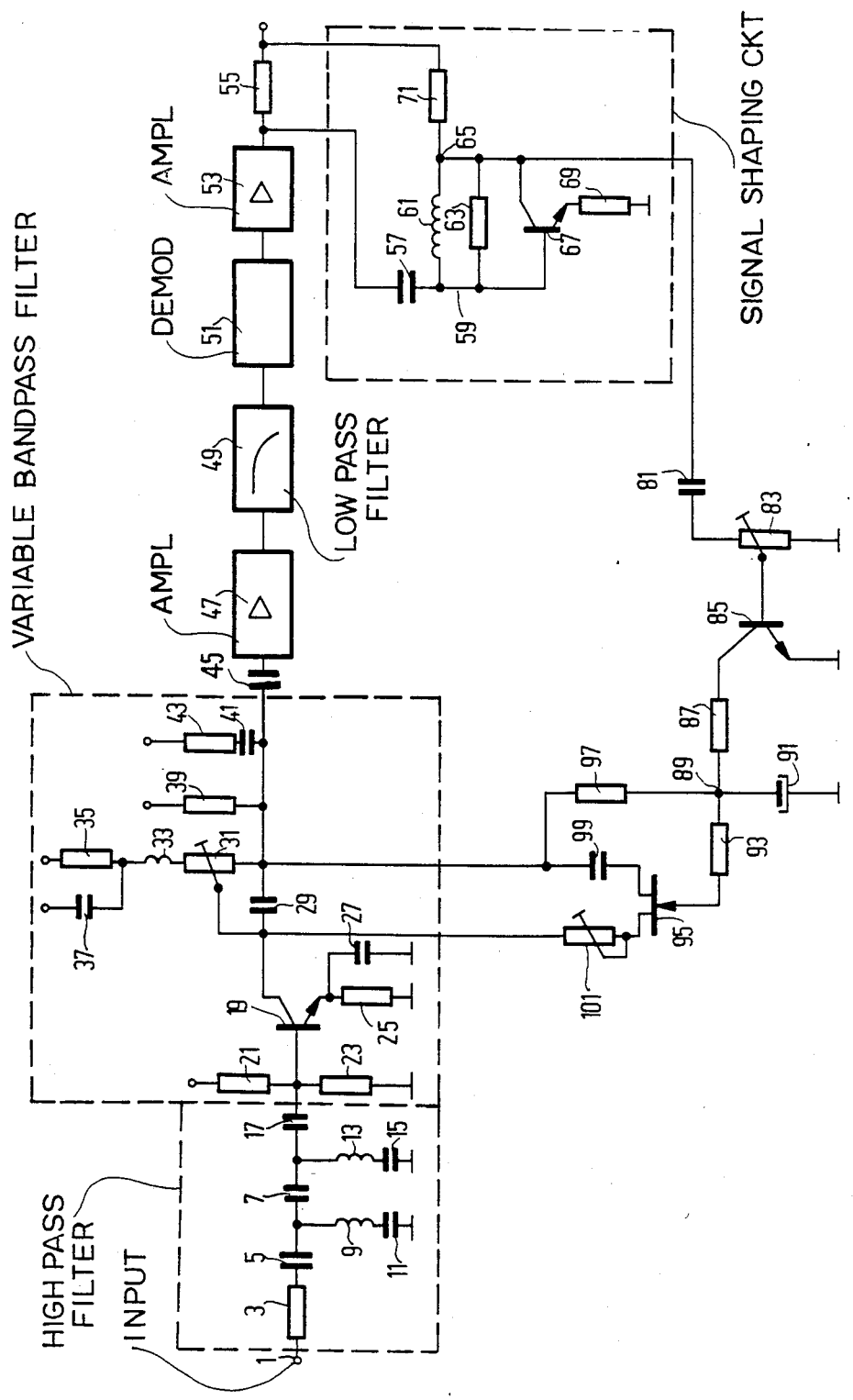

AUTOMATIC FM SIDEBAND LEVEL CONTROL FOR VIDEO RECORDERS

The invention relates to a circuit arrangement for a luminance-signal playback channel of a video playback apparatus, comprising
an input terminal for receiving an input signal,
a band-pass filter whose frequency characteristic is variable in order to influence the amplitude characteristic of the FM sideband spectrum, and
a demodulator and a crispening circuit which are arranged after the band-pass filter.

In video recorders a luminance signal is frequency-modulated before being recorded. The carrier frequency used for this purpose is, for example, 3 MHz in home-entertainment video recorders. During playback the lower and upper sideband levels should be as symmetrical as possible relative to this carrier frequency in order to ensure that after the demodulator a maximum level is obtained for the higher frequencies, i.e. the picture is as sharp as possible. Particularly in home-entertainment video recorders the properties of the tape material differ widely. For example, more current tapes provide a substantially stronger high-frequency response in the range from 4 to 5 MHz than older tapes. This has the advantage of a larger signal-to-noise ratio but gives rise to the problem that during playback on an apparatus adapted to tapes of an older type the demodulator receives sidebands which are highly asymmetrical relative to the carrier frequency, which results in an unsharp picture and in the extreme case a disturbed picture. Conversely, if the recorder is adapted to tapes of a more current type with a stronger high-frequency response, the problem arises that with tapes of an older type the lower sideband level is stronger than the upper sideband level. Therefore such an apparatus can only be set to provide optimum results in conjunction with tapes of a specific sensitivity, other types of tape giving a deterioration in playback quality.

It is the object of the invention to provide a video playback apparatus which, without being readjusted, enables tapes having different characteristics to be played back with an optimum picture sharpness and without picture disturbances.

According to the invention this object is achieved in that the band-pass filter comprises a control input for receiving a control signal, in that the band-pass filter is adapted in such a way that its frequency characteristic is controlled in response to the control signal, in that a control-signal generator is connected to the crispening circuit to derive the control signal from the pre-emphasised luminance signal taken from the crispening circuit, and in that the circuit arrangement is adapted to produce on an output of the band-pass filter an FM spectrum which is substantially amplitude-symmetrical relative to the FM carrier frequency in response to the control signal.

In order to influence the FM sideband spectrum the band-pass filter preceding the demodulator has no longer a fixed frequency characteristic but is influenced by means of an automatic control circuit which receives a pre-emphasised luminance signal taken from the crispening circuit arranged after the demodulator. Preferably, this signal is integrated over a plurality of picture intervals. If the signal exceeds a specific level this means that the pre-emphasis is too strong and that the upper sideband of the FM spectrum should be attenuated more strongly, which is effected by the automatic control circuit by adapting the frequency characteristic of the filter.

This circuit arrangement has the advantage that it not only enable tapes of a specific type but also tapes having different sensitivities and frequency characteristics to be used without the frequency characteristic of the band-pass filter having to be readjusted for every tape or without the picture being disturbed.

An embodiment of the invention will be described in more detail, by way of example, with reference to the drawing.

In the sole Figure of the drawing a playback channel, known per se, of a video playback apparatus is shown. From the input 1 of the arrangement the signal supplied by the video heads is applied to a variable band-pass filter via a high-pass filter followed by an amplifier stage, the frequency characteristic of the band-pass filter being adjustable by means of a potentiometer. This band-pass filter is followed by a further amplifier stage, after which a low-pass filter is arranged. After the low-pass filter the signal is demodulated, further amplified and subsequently applied to a crispening circuit which boosts the high-frequency components of the luminance signal in order to improve picture definition.

The circuit arrangement is constructed as follows. From the input 1 the signal from the video heads is applied to the high-pass filter which comprises a series arrangement of a resistor 3, two capacitances 5 and 7, whose junction point is connected to earth via an inductance 9 in series with a capacitance 11, and an inductance 13 in series with a capacitance 15 which are arranged between said capacitance 7 and earth. After this high-pass filter the signal is applied to the base of the transistor 19 via a coupling capacitance 17, which transistor is connected to the power supply by a resistor 21 and to earth by a resistor 23. The emitter of the transistor 19 is connected to earth by a parallel arrangement of a resistor 25 and a capacitor 27. The collector of the transistor 19 is connected to the variable band-pass filter. A potentiometer 31 is arranged in parallel with a capacitor 29 connected to the collector of the transistor 19 the wiper of this potentiometer being connected to the collector of the transistor 19, one end of its winding tapping off the signal behind the capacitor 29 and its other end being connected to the power supply via an inductance 33 and a parallel arrangement of a resistor 35 and a capacitance 37. The capacitance 29 is connected to the power supply via a resistor 39 and the series arrangement of a capacitance 41 and a resistor 43. After this variable band-pass filter the signal is applied to a first amplifier stage 47 via a coupling capacitance 45, to a low-pass filter 49, to the demodulator 51 and to a second amplifier stage 53, which are not shown in detail. This amplifier stage 53 is followed by a resistor 55. The crispening circuit is connected across this resistor 55. The signal before the resistor 55 is applied to the node 59 via a capacitance 57. This node 59 is connected to the node 65 via an inductance 61 and a resistor 63. Further, the base of a transistor 67 is connected to the node 59 and the collector is connected to the node 65. The emitter of the transistor 67 is connected to earth via a resistor 69. The signal on the node 65 is applied to a point after the resistor 55 via a resistor 71.

The frequency characteristic of the variable band-pass filter is controlled automatically by means of the following circuit. From the node 65 of the crispening circuit the signal is applied to the first tapping of a potentiometer 83 via a capacitance 81, the second tapping of said potentiometer being connected to earth. The wiper of the potentiometer 83 is connected to the base of a transistor 85 whose emitter is connected to earth and whose collector is connected to a node 89 via a resistor 87. This node 89 is connected to earth via a capacitance 91, to the gate of a field-effect transistor 95 via a resistor 93, and to the junction point of the capacitance 29 and the resistor 39 via a resistor 97. The source of the field-effect transistor 95 is connected to one end of the winding and to the wiper of a potentiometer 101, whose other winding end is connected to the junction point between the transistor 19 and the capacitance 29. The drain of the field-effect transistor 95 is connected to the junction point of the capacitance 29 and the resistor 39 via a capacitance 99.

The circuit arrangement operates as follows: The capacitance 91 is charged via the resistor 97 by the luminance signal after the capacitance 29 which signal has not yet been demodulated, so that the field-effect transistor 95 is fully conductive. As a result of the potentiometer 101 the minimum resistance of the series arrangement of the potentiometer 101 and the field-effect transistor 95 has a value unequal to zero. The potentiometer 31 is set for operation with normal tapes, i.e. tapes having a substantially average frequency response. By way of the capacitance 81 and the potentiometer 83 the luminance signal, which exhibits a preemphasis of for example 10 dB at 3 MHz, is applied to the transistor 85. The potentiometer 83 is set in such a way that the transistor 85 is not yet turned on when the 3-MHz component is normal. However, once a specific level is exceeded the transistor 85 is turned on and the capacitance 91 is discharged via the resistor 87 and the transistor 85. This causes the impedance of the field-effect transistor to increase. The resistance connected to the capacitance 29 consequently increases, so that the frequency characteristic of the band-pass filter is adapted. The basic setting of the frequency characteristic of this band-pass filter is determined by the potentiometer 31 arranged in parallel with the field-effect transistor 95 and the potentiometer 101. When the field-effect transistor 95 is cut off only the potentiometer 31, which determines the basic setting of the band-pass filter, is operative. If the field-effect transistor 95 is fully conductive, the setting of the potentiometer 101 is such as to provide the maximum effect of the automatic FM sideband level control. The potentiometer 83 determines the starting point of the automatic level control.

In the present embodiment the circuit arrangement has the additional advantage that the original playback channel of the apparatus need not be modified. It is only necessary to take a signal from the crispening circuit and to apply this signal to the automatic level control whose outputs are connected across the capacitance 29.

What is claimed is:

1. A circuit arrangement for a luminance signal playback channel of a video playback apparatus, comprising an input terminal for receiving an input signal with an FM carrier and an FM sideband spectrum, a bandpass filter connected to said input terminal, said bandpass filter having a frequency characteristic which is variable in order to influence the amplitude characteristic of the FM sideband spectrum, a demodulator connected to said bandpass filter, a signal shaping circuit connected to said demodulator, and a control signal generator connected to said signal shaping circuit to derive a control signal from the output of the signal shaping circuit, said bandpass filter comprising a control input for receiving said control signals, said bandpass filter having a frequency characteristic which is controlled in response to the control signal, wherein said circuit arrangement in response to said control signal produces on an output of the bandpass filter an FM spectrum which is substantially amplitude symmetrical relative to the FM carrier frequency.

2. A circuit arrangement as claimed in claim 1 wherein said control signal generator comprises an integrator for integrating the luminance signal taken from the signal shaping circuit over a plurality of picture intervals.

3. A video playback apparatus having a circuit arrangement as claimed in claim 1 or claim 2.

* * * * *